United States Patent [19]

Illerhaus et al.

[11] Patent Number: 4,537,097
[45] Date of Patent: Aug. 27, 1985

[54] METHOD AND APPARATUS FOR MANUFACTURING CUTTING ELEMENTS PARTICULARLY FOR DEEP DRILLING

[75] Inventors: Roland Illerhaus, Spore, Singapore; Rainer Jürgens, Celle, Fed. Rep. of Germany

[73] Assignee: Christensen, Inc., Salt Lake City, Utah

[21] Appl. No.: 566,607

[22] Filed: Dec. 29, 1983

[30] Foreign Application Priority Data

Jan. 7, 1983 [DE] Fed. Rep. of Germany ....... 3300357

[51] Int. Cl.³ .............................. B22F 7/08; B22F 3/14; B23P 5/00; B24D 3/10
[52] U.S. Cl. ................................ 76/108 A; 76/101 R; 76/DIG. 12; 419/8; 419/11; 419/49; 428/553
[58] Field of Search ............. 76/101 R, 108 R, 108 A, 76/107 R, DIG. 11, DIG. 12; 419/49, 11, 8, 42; 428/553

[56] References Cited

U.S. PATENT DOCUMENTS 2,299,207 10/1942 Bevillard ................................. 419/11
3,453,719 7/1969 Feenstra ................................. 419/11
3,745,623 7/1973 Wentorf, Jr. et al. ............. 76/101 A

FOREIGN PATENT DOCUMENTS 2916709 10/1980 Fed. Rep. of Germany ........ 419/49
31563 3/1980 Japan ..................................... 419/11
605261 7/1948 United Kingdom ................... 419/11
990418 1/1983 U.S.S.R. ................................. 419/11

Primary Examiner—Roscoe V. Parker
Attorney, Agent, or Firm—Jordan and Hamburg

[57] ABSTRACT

A base powder mixture consisting of diamond material and solid support is inserted into the recess of a mold block for the manufacture of cutting elements for, in particular, deep drill bits, the mold block is then externally hermetically enclosed and hot isostatically pressed. The base powder mixture is, first of all, inserted directly into the recess, the mold block is then enclosed as a whole in a capsule and placed in a high pressure furnace in which pressure is applied to the mold block by a liquid or gaseous pressure medium and, finally, after cooling and lowering of the pressure, the capsule is removed and the finished cutting elements are taken out of the recess.

19 Claims, 2 Drawing Figures

METHOD AND APPARATUS FOR MANUFACTURING CUTTING ELEMENTS PARTICULARLY FOR DEEP DRILLING

BACKGROUND OF THE INVENTION

The invention relates to a method and device for the manufacture of cutting elements comprising diamond material bound in a metal matrix mass, in particular, for deep drill bits the method involving the hot pressing of a base powder mixture inserted into a recess of a mold block and hermetically enclosed in a high pressure furnace.

With the manufacture of cutting elements which comprise diamond material bound in a metal matrix mass, a close binding of the diamond material to the matrix mass, which serves as carrier, is desired. This binding is supposed to ensure that the diamond material remains in its carrier, even under the influence of shock-like shearing stress, which occurs during the cutting action. Basically, a binding between two materials can be attained by a diffusion process occurring at increased temperature, whereby a reciprocal penetration of the substances takes place in a peripheral area and thus produces a bonding zone. Since, however, diamond is unstable under atmospheric pressure at temperatures of this type, an increase of pressure must take place in addition to the temperature increase for a successful carrying out of the diffusion process.

From U.S. Pat. No. 3,745,623, a method for the manufacturing of cutting elements by means of hot pressing is already known. Here, a base powder mixture is, first of all, inserted into a recess, which is provided with a metal lining, of a mold block, the opening is then sealed with a cover sheet and a crown piece made of the same material is placed onto the mold block. This arrangement is inserted, if necessary, in a cascade manner into a high pressure furnace, and there sintered at increased temperature and increased pressure, whereby the pressure is applied in only one directional component. After cooling and lowering of the pressure, the cutting elements can be removed from the recesses of the mold blocks.

It was shown that the metal lining serving as hermetic seal for the base powder mixture during the sintering process allows only a relatively simple geometric shaping of the recesses, if it is not to be damaged due to extreme strain paths, when being placed against the walls of the recesses. In addition, a directed pressure increase during the sintering process leads, after cooling, to strains inside the cutting elements, which could bring about a premature destruction with subsequent shearing load.

SUMMARY OF THE INVENTION

An object of the invention is, with improved design possibilities, to maintain the reliability of the manufacturing process and to improve the physical properties of the finished cutting elements.

Another object is to provide a device which enables the manufacture of any geometric shape and, additionally, permits a more balanced application of pressure, in a device for the manufacture of cutting elements, including therein diamond material bound in a metal matrix mass, in particular for deep drill bits, which entails the provision of a mold block provided with a recess and insertable in a high pressure furnace.

A further object is to provide an improved method and apparatus or device for the manufacture of cutting elements, such as deep drill bits.

These and other objects and advantages of the present invention will become evident from the description which follows.

These objects are attained by the present method for the manufacture of cutting elements, generally including diamond material and bound in a metal matrix mass, in particular for deep drill bits, by hot pressing of a base powder mixture inserted into a recess of a mold block and hermetically enclosed in a high pressure furnace. The base powder mixture is, first of all, inserted directly into the recess, the mold block is then enclosed as a whole and placed in a high pressure furnace, in which pressure is applied to the mold block by a liquid or gaseous pressure medium, and finally, after cooling and lowering of the pressure, the capsule is removed, and the finished cutting elements are taken out of the recess.

In accordance with the method according to the invention, the cutting elements can be manufactured in any complicated shape, since the hermetic capsule is itself no longer adapted to the shape but merely surrounds the outer surface of the molded body. Moreover, as a result of the isostatic pressure application, an isotropic structure results which proves itself advantageous relative to the stability of the bond between the materials when great shearing forces occur. Further features of the invention are that, typically, and in preferred embodiments, the mold block is heated at a sintering temperature in the area of about 800° to 1000° C., and the temperature is maintained constant over a preset period of time; the mold block is generally subjected to a pressure in the area of about 1 to 3 kbar; the mold block is usually completely and tightly enclosed with a multipart capsule and the parts of the capsule are soldered, welded or flanged to one another; prior to inserting the base powder mixture, coarse-grained diamonds and/or polycrystalline sintered diamond bodies are preferably placed into depressions in the recess of the mold block; and typically a tool connecting piece is placed onto the base powder mixture.

In addition, the invention relates to a device for the manufacture of cutting elements, which comprise diamond material bound in a metal matrix mass, in an embodiment, in which, in particular for deep drill bits, the device includes a mold block provided with a recess and insertable in a high pressure furnace, and generally in which the mold block can be enclosed with a capsule made of thin-walled, flexible, pressure-tight and temperature-resistant material. Typically, the mold block consists of graphite, and the capsule is made out of a two-piece shell which is adjusted to the mold block. This creates a device which enables the manufacture of any geometric shape and, additionally, permits a more balanced application of pressure.

The invention accordingly consists in the method and apparatus or device for the manufacture of cutting elements, in particular for deep drill bits, as described supra, and as will appear infra from the detailed description of the drawings and preferred embodiments, and as will be elucidated in the appended claims.

BRIEF DESCRIPTION OF THE DRAWINGS

The invention will now be illustrated with reference to two examples of an embodiment which are depicted in the drawings, showing in the respective Figures.

DESCRIPTION OF THE PREFERRED EMBODIMENTS

Figure 1:
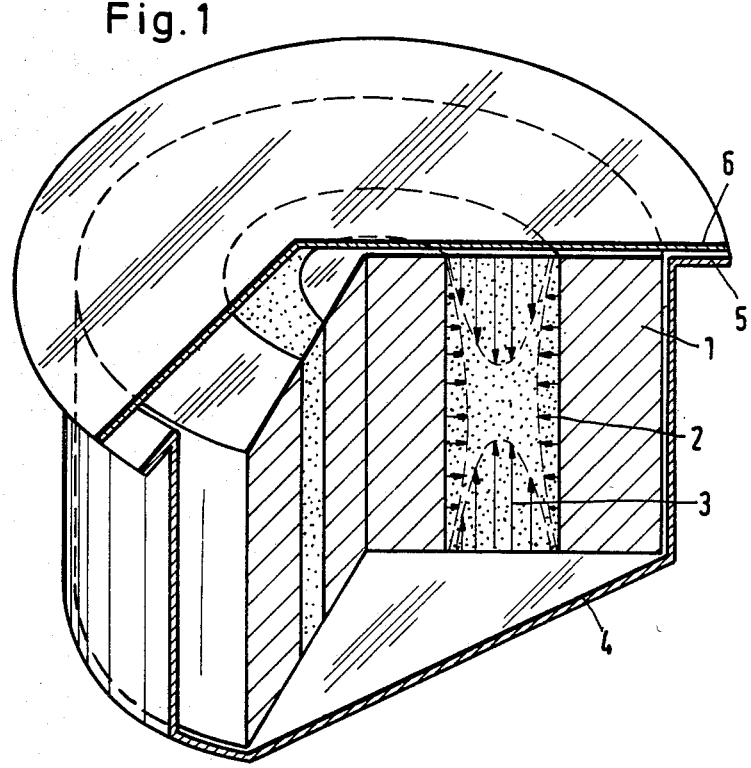
FIG. 1 is a sectional isometric view of one embodiment of the present invention, in this case for the manufacture of simple cutting elements.

The device shown in FIG. 1 comprises a mold block 1 formed out of graphite into which a J-shaped recess 2 is sunk. During the manufacturing process, the base powder mixture 3 is filled into this recess until the mixture 3 seals with the upper surface. Moreover, the device comprises a capsule consisting of a thin-walled casing 4, which discharges into a collar 5 at its upper end. The casing 4 can be hermetically sealed with a cover 6, so that, after insertion of the base powder mixture, the collar 5 is flanged, welded or soldered with the cover 6. In addition, in the sectional plane of mold block 1, the pressure cones are indicated by arrows, the pressure cones forming within the base powder mixture 3 during isostatic pressure application onto the mold block 1.

The sintering process takes place in a high pressure furnace, which is not illustrated here, and which comprises a heating device and a pressure chamber into which a liquid or gaseous working medium is forced under high pressure.

Figure 2:
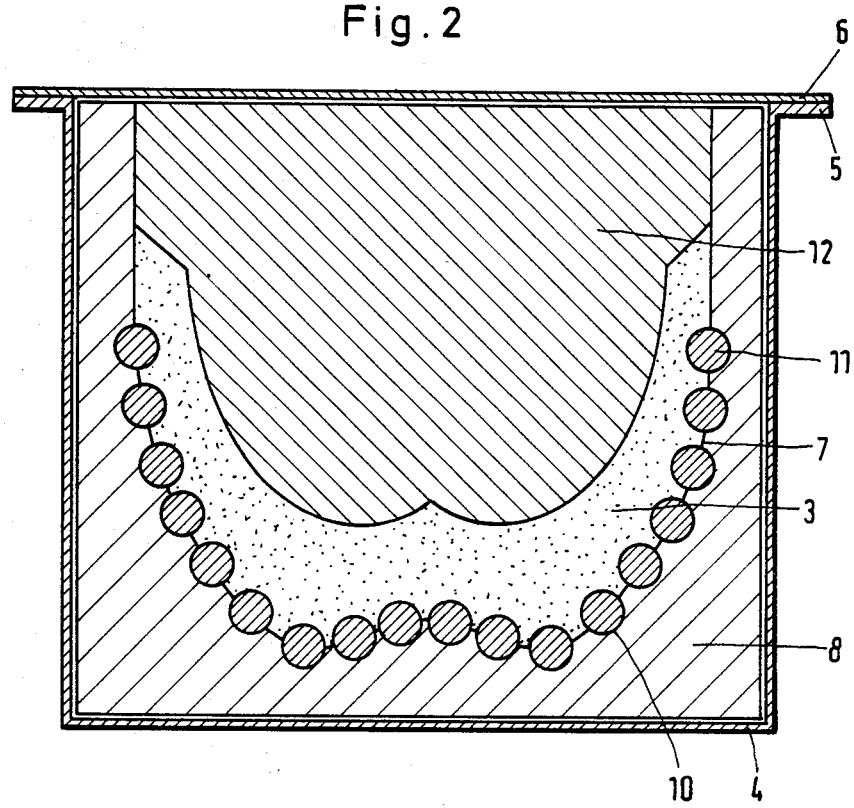
FIG. 2 is a device according to the present invention for the manufacture of a cutting element in the form of a bit head and shown in sectional elevation view.

Referring now to FIG. 2, depressions 10, into which sintered diamond bodies 11 are inserted prior to inserting the powder mixture 3, are already molded into recess 7 of mold block 8, as seen in FIG. 2. A metallic tool connecting piece 12, with which the powder mixture 3 also firmly binds during the sintering process, is finally placed onto powder mixture 3. The construction of the thin-walled casing 4 and the cover 6 can be compared with the one in FIG. 1. As the exemplified embodiments show, the casings 4 and covers 6 can initially be prefabricated in series for covering mold blocks 1 or 8, respectively, independent thereof as to how the subsequent recess 2 or 7 respectively is shaped.

If the cutting elements can be upwardly removed without destruction of the mold block, the mold blocks can also be repeatedly used, so that only the thin-walled covering, which is simple to manufacture, must be replaced. A destruction of the mold block can be avoided in many instances, since the molding floor expands in a splitting manner when the mold pressure is discontinued, so that the cutting element or elements can be readily removed from the mold block, in particular, with simple geometric shapes.

It thus will be seen that there is provided a method and device or apparatus for the manufacture of cutting elements which attains the various objects of the invention and which is well adapted for the conditions of practical use. As various alternatives within the scope of the present invention, besides those alternatives, modifications, equivalents and variations mentioned supra, will occur to those skilled in the art, it will be understood that the invention is limited only by the scope of the recitations in the appended claims, and equivalents thereof, both structural and functional.

We claim:

1. A method for the manufacture of cutting elements containing diamond material bound in a metal matrix mass which comprises:

(a) providing a mold block, said mold block having at least one recess;
(b) providing a base powder mixture, said base power mixture containing components comprising solid particulate diamond material and solid particulate metal matrix carrier material;
(c) inserting said base powder mixture into said recess in said mold block;
(d) externally hermetically enclosing said mold block, after step (c), in a capsule enclosure, said capsule enclosure being composed of thin-walled, flexible, pressure-tight and temperature-resistant material, said capsule enclosure surrounding the outer surface of said mold block;
(e) sintering the hermetically enclosed mold block of step (d) at elevated temperature and pressure so that said diamond material is closely bound to said metal matrix material in a metal matrix mass;
(f) reducing the temperature and pressure about said hermetically enclosed mold block so that said mold block is cooled;
(g) removing said capsule enclosure from about said mold block; and
(h) removing at least one finished cutting element comprising said diamond material bound in said metal matrix mass from said recess in said mold block.

2. The method of claim 1, in which the finished cutting element of step (h) is utilized for deep drill bits.

3. The method of claim 1, in which the mold block is essentially comprised of graphite.

4. The method of claim 1, in which the recess in the mold block is a J-shaped recess which is sunk into the mold block.

5. The method of claim 1 comprising heating the mold block according to step (e) at a sintering temperature in the range of about 800° C. to 1000° C., and maintaining the temperature substantially constant over a preset period of time.

6. The method of claim 1 comprising subjecting the mold block to a pressure in the range of about 1 kbar to 3 kbar in step (e), the application of elevated pressure according to step (e) is an isostatic pressure application.

7. The method of claim 1, in which the structure of the finished cutting element produced according to step (h) is an isotropic structure so that there is stability of the bond between the materials of the finished cutting element when shearing forces occur during usage of the finished cutting element.

8. The method of claim 1 comprising producing the elevated pressure in step (e) by disposing the hermetically enclosed mold block in the pressure chamber of a high pressure furnace, and applying elevated pressure by means of a fluid working medium, said fluid working medium being forced into said pressure chamber of said high pressure chamber under high pressure so that a balanced application of pressure takes place.

9. The method of claim 1 comprising completely and tightly enclosing the mold block with a multipart capsule, and soldering, welding or flanging the parts of said capsule to one another.

10. The method of claim 1, in which the surface of the recess in the mold block is provided with a plurality of spaced-apart depressions, and placing coarse-grained diamonds and/or polycrystalline sintered diamond bodies into said depressions, prior to step (c) so that said components disposed in said depressions are firmly bound to said metal matrix mass during the sintering process according to step (3).

11. The method of claim 10 comprising placing a metallic tool connecting piece onto the base powder mixture prior to the externally hermetic enclosing of the mold block according to step (d) so that the base powder mixture also firmly binds, as a metal matrix mass, to said metallic tool connecting piece, during the sintering process according to step (e).

12. The method of claim 1 comprising placing a metallic tool connecting piece onto the base powder mixture prior to the externally hermetic enclosing of the mold block according to step (d) so that the base powder mixture firmly binds, as a metal matrix mass, to said metallic tool connecting piece during the sintering process of step (e).

13. The method of claim 1 comprising forming the capsule enclosure of step (d) of a two-piece shell, said shell being adjusted to the mold block, the two members of said shell being hermetically sealed to each other.

14. The method of claim 1 comprising forming pressure cones within the base powder mixture due to isostatic pressure application onto the mold block during step (e).

15. An apparatus for the manufacture of cutting elements containing diamond material bound in a metal matrix mass which comprises a mold block, said mold block being provided with at least one recess, said recess being conformed to receive a base powder mixture containing components comprising solid particulate diamond material and solid particulate metal matrix carrier material, capsule enclosure means, said capsule enclosure means comprising thin-walled, flexible, pressure-tight and temperature-resistant material, and means to externally hermetically enclose said mold block within said capsule enclosure means so that said capsule enclosure means surrounds the outer surface of said mold block, whereby said mold block, when hermetically enclosed in said capsule enclosure means, is inserted into a high pressure furnace or the like in order to sinter said hermetically enclosed mold block at elevated temperature and pressure.

16. The apparatus of claim 15, in which the mold block is essentially composed of graphite.

17. The apparatus of claim 15, in which the capsule enclosure means is formed out of a two-piece shell, said shell being adjusted to the mold block, the two members of said shell being hermetically sealed to each other.

18. The apparatus of claim 15, in which the surface of the recess in the mold block is provided with a plurality of spaced-apart depressions, said depressions in the surface of the recess in the mold block being capable of receiving coarse-grained diamonds and/or polycrystalline sintered diamond bodies.

19. The apparatus of claim 15, in which the recess in the mold block is a J-shaped recess which is sunk into the mold block.

* * * * *